United States Patent [19]

Scola

[11] 3,926,904
[45] Dec. 16, 1975

[54] CURABLE CRACK-RESISTANT EPOXY RESIN

[75] Inventor: Daniel A. Scola, Glastonbury, Conn.

[73] Assignee: United Technologies Corporation, Hartford, Conn.

[22] Filed: Sept. 30, 1974

[21] Appl. No.: 510,259

[52] U.S. Cl......... 260/42.28; 260/32.8 EP; 260/836; 260/837 R
[51] Int. Cl.² ................. C08L 63/00; C08K 5/15
[58] Field of Search ............... 260/836, 837, 42.28

[56] References Cited
UNITED STATES PATENTS

| | | | |
|---|---|---|---|
| 3,639,500 | 2/1972 | Muny | 260/836 |
| 3,673,274 | 6/1972 | Tomalia | 260/836 |
| 3,678,130 | 7/1972 | Klapprott | 260/836 |
| 3,678,131 | 7/1972 | Klapprott | 260/836 |
| 3,686,359 | 8/1972 | Soldatos | 260/836 |
| 3,707,583 | 12/1972 | McGown | 260/836 |
| 3,823,107 | 7/1974 | Cotton | 260/837 |

OTHER PUBLICATIONS

R. S. Drake et al., Liquid Butadiene/Acrylonitrile Polymers With Reactive Terminals, Rubber World, Oct. 1968, pp. 51–56.

*Primary Examiner*—Paul Lieberman
*Attorney, Agent, or Firm*—John D. Del Ponti

[57] ABSTRACT

A curable resin composition comprises, in weight percent referring to the total weight of components (a) through (c): (a) 35–75% of a bicyclopentadiene ether epoxy resin, (b) 25–55% of a polyglycidyl ether of phenol-formladehyde novolac resin having an epoxy equivalent weight of 170–210 and a viscosity at 52°C of 1,400–90,000 centipoises, (c) 1–15% of a reactive elastomer selected from the group consisting of a functionally terminated butadiene homopolymer, a functionally terminated butadiene-acrylonitrile copolymer and a functionally terminated butadiene-styrene copolymer and (d) an aromatic polyamine curing agent in an amount sufficient to provide 0.5–2.0 amino hydrogen atoms of the amine for each epoxy group.

3 Claims, No Drawings

CURABLE CRACK-RESISTANT EPOXY RESIN

BACKGROUND OF THE INVENTION

This invention relates to an epoxy resin system and more particularly to a curable epoxy resin composition which retains both beneficial mechanical properties and a crack-free state after exposure to elevated temperatures.

It is known to utilize epoxy resins as the matrix material in the production of multi-ply, multidirectional graphite filament-reinforced composite materials. One of the major problems extant in their production is the inability of such composites to maintain a crack-free state after cool-down from elevated temperatures while simultaneously retaining beneficial mechanical properties. In general, state of the art epoxy resin-graphite systems either exhibit cracking after 300°F thermal cycling or display poor shear strengths at 300°F (i.e., below about 3,000 psi) or both. Primary emphasis in improving composite properties, of course, resides in providing advanced resins which possess a high 300°F tensile strength of over about 1,800 psi, preferably above about 2,000 psi, a high room temperature tensile strength of over approximately 5,000 psi, preferably above about 6,000 psi, and a high adhesion to and compatibility with carbon yarn so that unidirectional composites made therewith will display at room temperature, shear strengths of at least 5,000 psi and, at 300°F, shear strengths greater than 3,000 psi and multidirectional composites made therewith will, after 300°F thermal cycling, maintain the crack-free state.

SUMMARY OF THE INVENTION

In general, the present invention contemplates a curable resin system resulting from a combination of a high temperature-resistant epoxy resin, a high strength eposy resin, an elastomer capable of cross-linking or reacting with the epoxy polymer chains, and an aromatic polyamine curing agent.

More particularly the invention centers on a curable resin system comprising approximately, in weight percent referring to the total weight of components (a) through (c): (a) 35–75% of a bicyclopentadiene either epoxy resin, preferably 40–65% of a glycerol modified bicyclopentadiene ether epoxy resin, (b) 25–55% of a polyglycidyl ether or phenol-formaldehyde novolac resin having an epoxy equivalent weight of 170–210 and a viscosity at 52°C of 1,400–90,000 centipoises, preferably 30–50% of one having an epoxy equivalent weight of 175–182 and a viscosity at 52°C of 30,000–90,000 centipoises, (c) 1–15% of an elastomer selected from the group consisting of a butadiene homopolymer, a butadiene-acrylonitrile copolymer and a butadiene-styrene copolymer, preferably 3–11% of an elastomer selected from the group consisting of a hydroxyl terminated homopolymer of butadiene, a carboxyl terminated homopolymer of butadiene, a hydroxyl terminated butadiene-acrylonitrile copolymer, a carboxyl terminated butadiene-acrylonitrile copolymer, a hydroxyl terminated butadiene-styrene copolymer and a carboxyl terminated butadiene-styrene copolymer and (d) an aromatic polyamine curing agent in an amount sufficient to provide 0.5–2.0 amino hydrogen atoms of the amine for each epoxy group, preferably an aromatic polyamine curing agent selected from the group consisting of 4,4'-methylenedianiline (MDA), meta-phenylenediamine (m-PDA), p-phenylenediamine, 2,4-toluenediamine, 2,5-toluenediamine, 2,5-diaminochlorobenzene, 2,4-diaminoanisole, 1,4-diaminonaphthalene, 4,4'-diaminodiphenylsulfone, 4,4'-diaminodiphenylether, 4,4'-diaminodiphenylsulfide, 4,4'-diaminophenylsulfoxide, 4,4'-isopropylidene-dianiline, 4,4'-diaminobiphenyl (benzidine), 2,6-diaminopyridine, meta-xylylene diamine, m-aminobenzylamine, 4-chloro-o-phenylene-diamine, diaminoditolylsulfone, methylenebis(o-chloroaniline) and 3,3'-biphenyldiamine. Another suitable curing agent is the high molecular weight aromatic polyamine sold as Furan Plastics 9245.

The inventive resins, after curing, possess both a high 300°F tensile strength as well as a high room temperature strength. The term "high 300°F tensile strength", for the purposes of the present invention, is defined to mean a tensile strength, measured at 300°F, of over 1,800 psi, preferably over about 2,000 psi. The term "high room temperature tensile strength" is defined to mean a tensile strength, measured at room temperature, of over 5,000 psi, preferably above approximately 6,000 psi. Unidirectional graphite yarn-reinforced composites made with the inventive resins display, at room temperature, shear strengths of at least 5,000 psi and, at 300°F, shear strengths above 3,000 psi while multidirectional composites made therewith, after 300°F thermal cycling, remain essentially crack-free.

DESCRIPTION OF THE PREFERRED EMBODIMENT

The curable composition of the present invention comprises a blend of approximately, in weight percent referring to the total weight of components (a) through (c): (a) 35–75% bicyclopentadiene ether epoxy resin, preferably 40–65% of a glycerol modified bicyclopentadiene ether epoxy resin, (b) 25–55% polyglycidyl ether of phenol-formaldehyde novolac resin having an epoxy equivalent weight of 170–210 and a viscosity at 52°C of 1,400–90,000 centipoises, (c) 1–15% of an elastomer selected from the group consisting of a butadiene homopolymer, a butadiene-acrylonitrile copolymer and a butadiene-styrene copolymer and (d) an aromatic polyamine curing agent in an amount sufficient to provide 0.5–2.0 amino hydrogen atoms of the amine for each epoxy group.

Typical glycerol modified bicyclopentadiene ether epoxy resins suitable for usage are, for example, those sold by Union Carbide Corporation under the trade names ERLA 4617, ERLB 4617 and ERLA 0400.

Commercially available polyglycidyl ether of phenol-formaldehyde resins considered suitable are listed in the following table.

Table I

| Trade Name | EPOXY NOVOLAC RESINS Epoxide Equiv. wt. | Viscosity, cps |
|---|---|---|
| DEN 431 (Dow Chemical) | 172–179 | 1,400–2,000 at 125°F |
| DEN 438 (Dow Chemical) | 175–182 | 30,000–90,000 at 125°F |
| NEN 439 (Dow Chemical) | 191–210 | 4,000–10,000 at 125°F |
| EPOTUF 37-170 (Reichhold) | 175–185 | 30,000–90,000 at 25°C |

Table I-continued

| Trade Name | EPOXY NOVOLAC RESINS Epoxide Equiv. wt. | Viscosity, cps |
|---|---|---|
| ERLB-0448 (Union Carbide) | 200 | 88,000 at 25°C |
| ERR-0100 (Union Carbide) | 190-200 | 85,000-100,000 at 25°C |
| EP1-rez 5155 (Jones-Dabney) | 175-190 | 30,000-90,000 at 52°C |
| EPN 1138 (Ciba) | 176-181 | 60,000 at 52°C |
| EPN 1139 (Ciba) | 172-179 | 1,700 at 52°C |
| EPON 152 (Shell) | 172-179 | 1,400-2,000 at 52°C |
| EPON 154 (Shell) | 176-187 | 3,500-7,000 at 52°C |

Suitable elastomers are the reactive functionally terminated butadiene elastomeric resins including (1) the hydroxyl terminated homopolymer of butadiene R-15M or R-45(A) sold by Arco Chemical Co., (2) the carboxyl terminated homopolymer of butadiene, (3) the hydroxyl terminated butadiene-acrylonitrile copolymer made from, by weight, 85% butadiene and 15% acrylonitrile sold by Arco Chemical Co. under the trade name CN-15, (4) the carboxyl terminated butadiene-acrylonitrile copolymer made from 60-80% butadiene and 40-20% acrylonitrile, as for example, that sold by B. F. Goodrich Chemical Co. known as HYCAR 1042 or 1312 modified with carboxyl groups or HYCAR 1472, (5) the hydroxyl terminated butadiene-styrene copolymer made from 85% butadiene and 15% styrene sold by Arco Chemical Co. under the trade name CS-15 and (6) a carboxyl terminated butadiene-styrene copolymer made from 60-80% butadiene and 40-20% styrene. The amount of elastomer utilized is critical since too much (i.e., above approximately 15%) results in a soft and rubbery product which will not fully cure and too little (i.e., below approximately 1%) results in a cured resin which is brittle and prone to cracking. Suitable curing agents are those aromatic polyamines selected from the group consisting of 4,4'-methylenedianiline (MDA), meta-phenylenediamine (m-PDA), p-phenylenediamine, 2,4-toluenediamine, 2,5-toluenediamine, 2,5-diaminochlorobenzene, 2,4-diaminoanisole, 1,4-diaminonaphthalene, 4,4'-diaminodiphenylsulfone, 4,4'-diaminodiphenylether, 4,4'-diaminodiphenylsulfide, 4,4'-diaminophenylsulfoxide, 4,4'-isopropylidene-dianiline, 4,4'-diaminobiphenyl (benzidine), 2,6-diaminopyridine, meta-xylylene diamine, m-aminobenzylamine, 4-chloro-o-phenylenediamine, diaminoditolylsulfone, methylenebis (o-chloroaniline), 3,3'-biphenyldiamine and commercially available Furan Plastics 9245. The above components (a) through (c) may be mixed at any time and then stored indefinitely until ready for use. When desired, the mixture is blended with 13-33%, by weight, of the curing agent and then preferably placed in solution by addition of a solvent. Solvents that may be used are those in which all components are soluble such as, for example, methyl ethyl ketone, acetone, cyclohexanone, methyl isobutyl ketone or the like and mixtures thereof. Of course, if desired for immediate usage, all of the components may be blended together at the same time and then put into solution. As will be appreciated, the formulations are then cured as desired, preferably according to the schedules shown herein.

A more complete understanding of the invention will be obtained in light of the following specific examples given in Table II. The designated properties were determined by standard ASTM methods, more particularly D 638-64T (tensile strength), D 638-64T (modulus) and D 2344-65T (shear strength).

Table II

| | TENSILE PROPERTIES OF CRACK-RESISTANT EPOXY RESIN | | | | | | | | | | |
|---|---|---|---|---|---|---|---|---|---|---|---|
| | Resin Formulation | | | | | | Room Temperature Tensile | | | 300°F Tensile | | |
| Ex. | ERLA 4617 parts, by wt (wt %) | DEN 438 parts, by wt (wt %) | CN-15 parts, by wt (wt %) | MDA parts, by wt (H/epoxy group) | m-PDA parts, by wt (H/epoxy group) | Cure cycle hrs/°C | Strength psi | Modulus 10⁶ psi | % Elong. | Strength psi | Modulus 10⁶ psi | % Elong. |
| 1 | 100 (48.5) | 100 (48.5) | 6 (3) | 98 (1.40) | — | 3/85+3/125 +16/160 | 6,700 | 0.47 | 0.8 | 3,000 | 0.20 | 8.8 |
| 2 | 100 (64) | 50 (32) | 6 (4) | 76 (1.33) | — | 3/85+3/125 +16/160 | 12,850 | 0.49 | 3.4 | 3,476 | 0.23 | 7.4 |
| 3 | 100 (47) | 100 (47) | 14 (6) | 76 (1.08) | — | 2/80+2/125 +2/160 | 6,000 | 0.55 | 12.2 | 3,580 | 0.22 | 26.0 |
| 4 | 100 (45.5) | 100 (45.5) | 20 (9) | 76 (1.08) | — | 2/80+2/125 +12/175 | 8,150 9,450 8,750 | 0.45 0.43 0.49 | 1.5 2.7 2.9 | 2,470 2,030 2,400 | 0.15 0.16 — | — — — |
| 5 | 100 (46.5) | 100 (46.5) | 16 (7) | 72 (1.01) | — | 4/85+4/125 +16/160 | 9,000 | 0.55 | — | 2,200 | 0.15 | — |
| 6 | 100 (45.5) | 100 (45.5) | 20 (9) | — | 38.4 (0.99) | — | — | — | — | — | — | — |
| 7 | 100 (44.5) | 100 (44.5) | 25 (11) | — | 35 (0.90) | — | — | — | — | — | — | — |
| 8 | 100 (45.5) | 100 (45.5) | 20 (9) | — | 40.7 (1.05) | — | — | — | — | — | — | — |
| 9 | 100 (46.5) | 100 (46.5) | 16 (7) | — | 38.4 (0.99) | — | — | — | — | — | — | — |

In order to assess the efficiency of the inventive resin formulations, a number of multi-ply, multidirectional graphite-epoxy composites were produced utilizing the resins of Examples 5 and 9 (respectively denoted in Table III as Resin Formulations A and B). The proportions of components (resins, elastomer and curing agent), as indicated in Table II, were thoroughly admixed. After mixing, the blend was dissolved in 50-60%, by weight, of methyl ethyl ketone and applied to commercially available graphite yarn (e.g., HMG-50 1,400 filaments/yarn bundle — 8.0 μ diameter filament from Hitco, HMG-300 1,400 filaments/yarn bundle — 8.0 μ diameter filament from Hitco, Courtaulds HMS 10,000 filaments/yarn bundle — 8.5 μ diameter filament from Hercules Inc. or Morganite I 10,000 filaments/yarn bundle — 8.5 μ diameter filament from Morganite Limited of England) by passing the fibers through the mixture and helically winding the impregnated fiber around the circumference of a drum 17.5 inches in diameter until a monolayer tape 4.0 inches wide was formed. Prior to resin impregnation, the HMG-50 yarn was treated according to the method of U.S. Pat. No. 3,720,536, although the remaining yarns were used as received from the manufacturer. The monolayer tape was removed from the drum and cut into sheets 4.0 × 6.0 inches. The solvent was removed by evaporation by heating the monolayer tape to 100°C for 15 minutes and the sheets were then stacked in a mold one on top of the other until there were either 16 layers of ± 45°, 0°, ± 45°, 4-8-4 construction (4 plies of alternating ± 45° orientation, 8 plies of 0° orientation and another 4 plies of ± 45° orientation) or 12 layers of ± 45°, 0°, ± 45°, 3-6-3 construction. The mold was put into a preheated press at contact pressure at 185°F (approximately 85°C) until the resin compound gelled (30–50 minutes). At gelation, the lay-up was subject to 185°F (approximately 85°C) and 200 psi for 4 hours, then 3 hours at 120°C and 200 psi, and thereby consolidated into a void-free cured composite. This was followed by the postcure indicated in Table III, in an air oven for 16 hours at either 160°C or 175°C.

Table III

SHORT BEAM SHEAR STRENGTHS OF UNIDIRECTIONAL GRAPHITE-EPOXY RESIN COMPOSITES

| Resin Formulation | Fiber (Vol %) | After 160°C Postcure RT | After 160°C Postcure 300°F | After 175°C Postcure RT | After 175°C Postcure 300°F |
|---|---|---|---|---|---|
| A | HMG-50 (41) | 7,950 | 5,475–5,500 | — | 5,120 |
| A | HMG-300 (46) | 7,520 | 3,575–4,500 | 7,360 | 2,965–3,460 |
| A | HMG-50 (37) | 6,500 | 4,770 | 7,100 | 3,830 |
| A | HMG-300 (42) | 7,700 | 5,160 | 7,900 | 5,000 |
| B | HMG-50 (30) | 6,650 | 5,500 | 6,850 | 5,050 |
| A | HMG-300 (71) | 8,900 | 6,500 | 8,400 | 3,530 |
| A | Morg IS (62) | 8,293 | 3,115–3,950 | 7,360 | 3,530 |
| A | Morg IS (46) | 6,660 | 4,770 | 8,500 | 3,550 |

Further testing was conducted with respect to crack-resistance. In this regard, 3-6-3 and 4-8-4 cross-ply (± 45°, 90°, ± 45°) graphite-epoxy laminates (dimensions: 1½ in. × 5 in. × 1/16–⅛ in.) were subjected to the same process techniques described for Table II. In addition, the composites were subjected to three thermal cycles from −65° to 300°F, each cycle comprising immersion in a chloroform-dry ice bath for 20–30 minutes, removal to ambient conditions with inspection for cracks, heating to 300°F and holding at that temperature for 30 minutes and cooling to room temperature and again inspecting for cracks. Results are listed in Table IV.

Table IV

CRACK RESISTANCE OF MULTIDIRECTIONAL GRAPHITE-EPOXY RESIN COMPOSITE

| Resin Formulation | Fiber | After 160°C Postcure | After 175°C Postcure | After Thermal Cycling |
|---|---|---|---|---|
| A | HMG-300 | No cracks | No cracks | Few (6) cracks |

Table IV-continued

CRACK RESISTANCE OF MULTIDIRECTIONAL GRAPHITE-EPOXY RESIN COMPOSITE

| Resin Formulation | Fiber | After 160°C Postcure | After 175°C Postcure | After Thermal Cycling |
|---|---|---|---|---|
| B | HMG-50 | No cracks | No cracks | No cracks |
| A | Court HMS | No cracks | No cracks | No cracks |

What has been set forth above is intended primarily as exemplary to enable those skilled in the art in the practice of the invention and it should therefore be understood that, within the scope of the appended claims, the invention may be practiced in other ways than as specifically described.

I claim:

1. A curable resin composition characterized by a high 300°F. and a high room temperature tensile strength and 0°–300°F. crack resistance comprising approximately, in weight percent referring to the total weight of components (a) through (c): (a) 35–75% of a glycerol-modified bicyclopentadiene ether epoxy resin, (b) 25–55% of a polyglycidyl ether of phenol-formaldehyde novolac resin having an epoxy equivalent weight of 170–210 and a viscosity at 52°C of 1,400–90,000 centipoises, (c) 1–15% of a reactive elastomer selected from the group consisting of a hydroxyl or carboxyl terminated butadiene homopolymer, a hydroxyl or carboxyl terminated butadiene-acrylonitrile copolymer and a hydroxyl or carboxyl terminated butadiene-styrene copolymer and (d) an aromatic polyamine curing agent in an amount sufficient to provide 0.5–2.0 amino hydrogen atoms of the amine for each epoxy group.

2. A curable resin composition characterized by a high 300°F. and a high room temperature tensile strength and 0°–300°F. crack resistance comprising approximately, in weight percent referring to the total weight of components (a) through (c): (a) 40–65% of a glycerol modified bicyclopentadiene ether epoxy resin, (b) 30–50% of a polyglycidyl ether of phenol-formaldehyde novolac resin having an epoxy equivalent weight of 175–182 and a viscosity at 52°C of 30,000–90,000 centipoises, (c) 3–11% of a reactive elastomer selected from the group consisting of a hydroxyl terminated homopolymer of butadiene, a carboxyl terminated homopolymer of butadiene, a hydroxyl terminated butadiene-acrylonitrile copolymer, a carboxyl terminated butadiene-acrylonitrile copolymer, a hydroxyl terminated butadiene-styrene copolymer and a carboxyl terminated butadiene-styrene copolymer, and (d) an aromatic polyamine curing agent in an amount sufficient to provide 0.5–2.0 amino hydrogen atoms of the amine for each epoxy group.

3. In a graphite yarn-reinforced epoxy resin composite, the improvement which comprises a crack-resistant epoxy resin matrix material having a high 300°F. and a high room temperature tensile strength comprising the fully cured product of, in weight percent referring to the total weight of components (a) through (c): (a) 35–75% of a glycerol-modified bicyclopentadiene ether epoxy resin, (b) 25–55% polyglycidyl ether of phenol-formaldehyde novolac resin having an epoxy equivalent weight of 170–210 and a viscosity at 52°C of 1,400–90,000 centipoises, (c) 1–15% reactive elastomer selected from the group consisting of a hydroxyl or carboxyl terminated butadiene homopolymer, a hydroxyl or carboxyl terminated butadiene-acrylonitrile copolymer and a hydroxyl or carboxyl terminated butadiene-styrene copolymer and (d) an aromatic polyamine curing agent in an amount sufficient to provide 0.5–2.0 amino hydrogen atoms of the amine for each epoxy group.

* * * * *